US012689870B2

(12) United States Patent
Al Bahri et al.

(10) Patent No.: US 12,689,870 B2
(45) Date of Patent: Jul. 21, 2026

(54) METHODS FOR PROVIDING REAL-TIME INTERACTIVE MANAGEMENT OF MOBILE ASSETS IN AN ENVIRONMENT AND DEVICES THEREOF

(71) Applicant: Jones Lang LaSalle IP, Inc., Chicago, IL (US)

(72) Inventors: Ahmed Al Bahri, Eching (DE); Dennis Baker, Mooresville, NC (US); Brandon Brien, Calgary (CA); Hai Dang, Summerfield, NC (US); Richard Martin, Prosper, TX (US); Priti Rao, Frisco, TX (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 610 days.

(21) Appl. No.: 18/201,615

(22) Filed: May 24, 2023

(65) Prior Publication Data

US 2024/0397284 A1 Nov. 28, 2024

(51) Int. Cl.
*H04W 4/029* (2018.01)
*G06Q 30/012* (2023.01)

(52) U.S. Cl.
CPC .......... *H04W 4/029* (2018.02); *G06Q 30/012* (2013.01)

(58) Field of Classification Search
None
See application file for complete search history.

(56) References Cited

U.S. PATENT DOCUMENTS

| | | | | |
|---|---|---|---|---|
| 2017/0026308 A1* | 1/2017 | Reagan | .................. | H04L 47/70 |
| 2018/0332434 A1* | 11/2018 | Kulkarni | ................ | H04L 43/08 |
| 2019/0332838 A1* | 10/2019 | Vancorenland | ...... | G06K 7/1413 |
| 2021/0027239 A1* | 1/2021 | Sittig | .................. | G06Q 10/087 |
| 2021/0089514 A1* | 3/2021 | Werner | .................. | G06F 21/64 |
| 2024/0056772 A1* | 2/2024 | Loda | ..................... | H04W 4/024 |
| 2024/0152887 A1* | 5/2024 | Filter | ....................... | H04L 9/50 |

* cited by examiner

*Primary Examiner* — Adolf Dsouza
(74) *Attorney, Agent, or Firm* — Troutman Pepper Locke LLP

(57) ABSTRACT

A method, system, and non-transitory computer readable medium includes initiating an identification of current geolocation data of registered assets in a defined environment. A real-time map of the registered assets positioned in the defined environment is generated and provided based on the identified geolocation data. A subset of the registered assets is identified for display in the asset management client application based on a request received from the asset management client application in the client device. Real time interaction from the asset management client application in the client device with a plurality of executable operations for a selected one of the subset of registered assets is enabled.

27 Claims, 9 Drawing Sheets

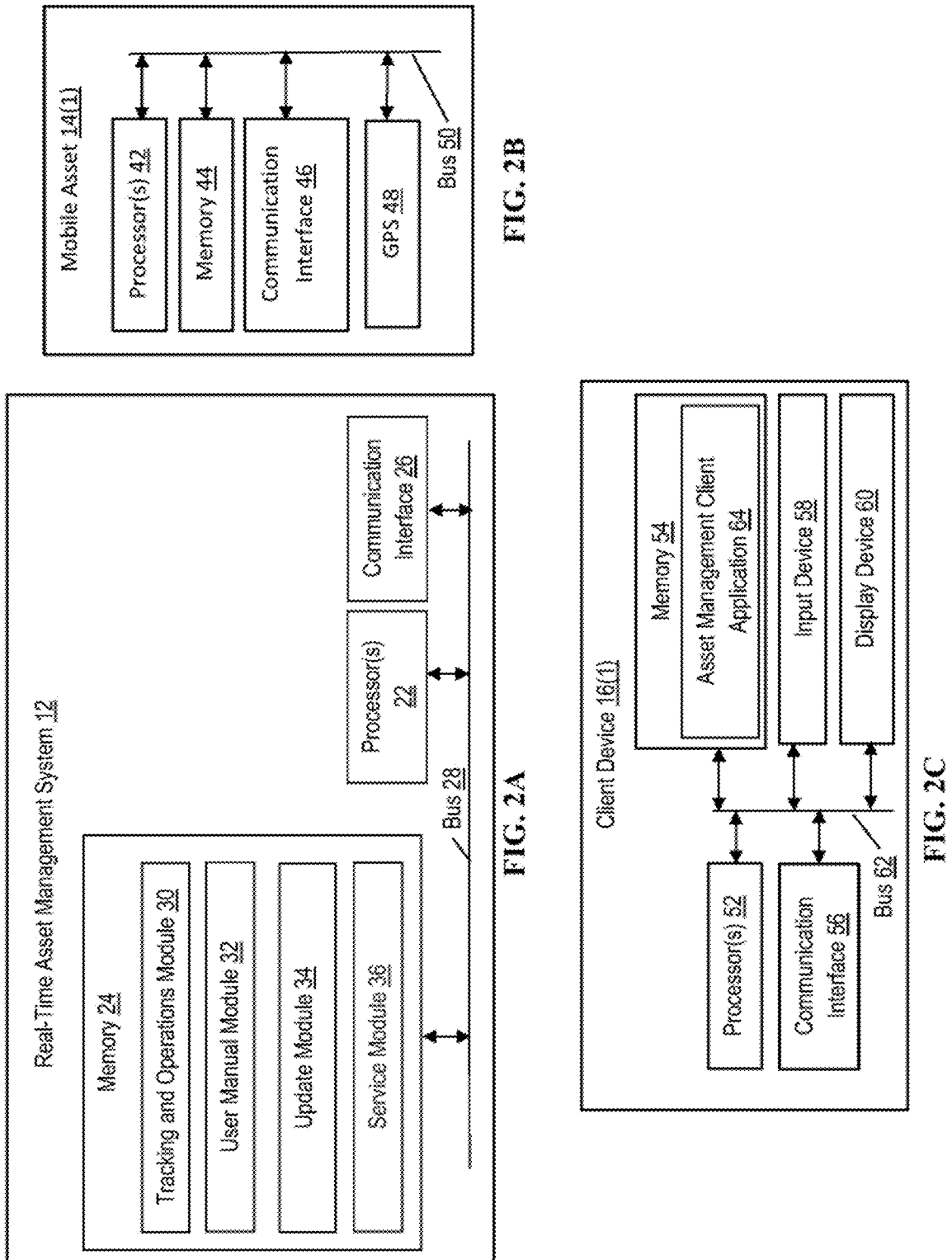

Mobile Asset 14(1)

Processor(s) 42

Memory 44

Communication Interface 46

GPS 48

Bus 50

FIG. 2B

Real-Time Asset Management System 12

Memory 24

Tracking and Operations Module 30

User Manual Module 32

Update Module 34

Service Module 36

Processor(s) 22

Communication Interface 26

Bus 28

FIG. 2A

Client Device 16(1)

Memory 54

Asset Management Client Application 64

Input Device 58

Display Device 60

Processor(s) 52

Communication Interface 56

Bus 62

FIG. 2C

METHODS FOR PROVIDING REAL-TIME INTERACTIVE MANAGEMENT OF MOBILE ASSETS IN AN ENVIRONMENT AND DEVICES THEREOF

FIELD

This technology relates to methods for providing real-time interactive management of assets in an environment and devices thereof.

BACKGROUND

By way of example, lost and stolen equipment costs the healthcare industry billions of dollars each year. This number is currently estimated to be approximately $765 Billion annually for the US Healthcare Industry. Government and Higher Education are another prime example where real-time asset tracking could save millions of dollars every year due to excess equipment purchases due to poor tracking and expense management.

To address this issue a number of prior tracking applications in combination with GPS tags, RFID tags, Bluetooth devices, or other tracker on assets have been developed. These prior tracking applications focus on physically locating an asset, however other than tracking the utility of these systems is very limited. In particular, these prior tracking applications fail to provide any interactive interaction or other management with any operational aspect of the assets. For example, while being able to identify a location of assets, the operator searching for a type of asset with these tracking applications may not be familiar with how to operate a particular type of an asset that has been located and these prior tracking applications fail to provide any mechanism to facilitate such an interaction. By way of another example, these prior tracking applications are not equipped to identify and manage any outstanding system updates for an asset that has been located. Further by way of example, the located asset may have one or more operational issues and these prior tracking applications are not able to provide any assistance with or manage any necessary warranty and repairs. Even further, these prior tracking applications fail to track a location of an asset and an amount of time away the asset is away from the home base location further limiting the ability of an operator to have an understanding of and manage any interaction with the located asset.

SUMMARY

A method, system, and non-transitory computer readable medium includes initiating, by a computing device, an identification of current geolocation data of registered assets in a defined environment. A real-time map of the registered assets positioned in the defined environment is generated and provided, by the computing device, based on the identified geolocation data. A subset of the registered assets is identified, by the computing device, for display in the asset management client application based on a request received from the asset management client application in the client device. Real time interaction from the asset management client application in the client device with a plurality of executable operations for a selected one of the subset of registered assets is enabled, by the computing device.

An asset management computing system comprising a memory comprising programmed instructions stored thereon and one or more processors configured to be capable of executing the stored programmed instructions to initiate an identification of current geolocation data of registered assets in a defined environment. A real-time map of the registered assets positioned in the defined environment is generated and provided based on the identified geolocation data. A subset of the registered assets is identified for display in the asset management client application based on a request received from the asset management client application in the client device. Real time interaction from the asset management client application in the client device with a plurality of executable operations for a selected one of the subset of registered assets is enabled.

A non-transitory computer readable medium having stored thereon instructions comprising executable code which when executed by one or more processors, causes the one or more processors to initiate an identification of current geolocation data of registered assets in a defined environment. A real-time map of the registered assets positioned in the defined environment is generated and provided, by the computing device, based on the identified geolocation data. A subset of the registered assets is identified, by the computing device, for display in the asset management client application based on a request received from the asset management client application in the client device. Real time interaction from the asset management client application in the client device with a plurality of executable operations for a selected one of the subset of registered assets is enabled, by the computing device.

This technology provides a number of advantages including providing methods, non-transitory computer readable medium, and systems that enable real-time interactive management of assets in an environment and devices thereof. Examples of this technology are able to track a location of any mobile asset in a set of assets including an amount of time away any of the mobile assets is away from a designated home base to further enhance the ability of an operator to understand and manage any interaction with the mobile asset. Additionally, examples of this technology are configured to identify and obtain owner's manual data to facilitate assisting an operator who may not be familiar with how to operate a particular type of asset. Examples of this technology also are able to automatically identify and manage any outstanding system updates for an asset in real time. Further, examples of this technology are configured to identify and assist with or manage interactions with other manufacturer or other service provider servers or computing device for any necessary warranty and other service and/or repairs of an asset. This interactive management also enables an operator to obtain a holistic view around and enable management of current necessary and/or desired interactions as well as of the lifecycle of the asset which was not previously possible with existing systems.

BRIEF DESCRIPTION OF THE DRAWINGS

FIG. 2A is a block diagram of the example of the real-time asset management system shown in FIG. 1;

FIG. 2B is a block diagram of one of the exemplary mobile assets shown in FIG. 1;

FIG. 2C is a block diagram of one of the exemplary client devices shown in FIG. 1:

DETAILED DESCRIPTION

Figure 1:
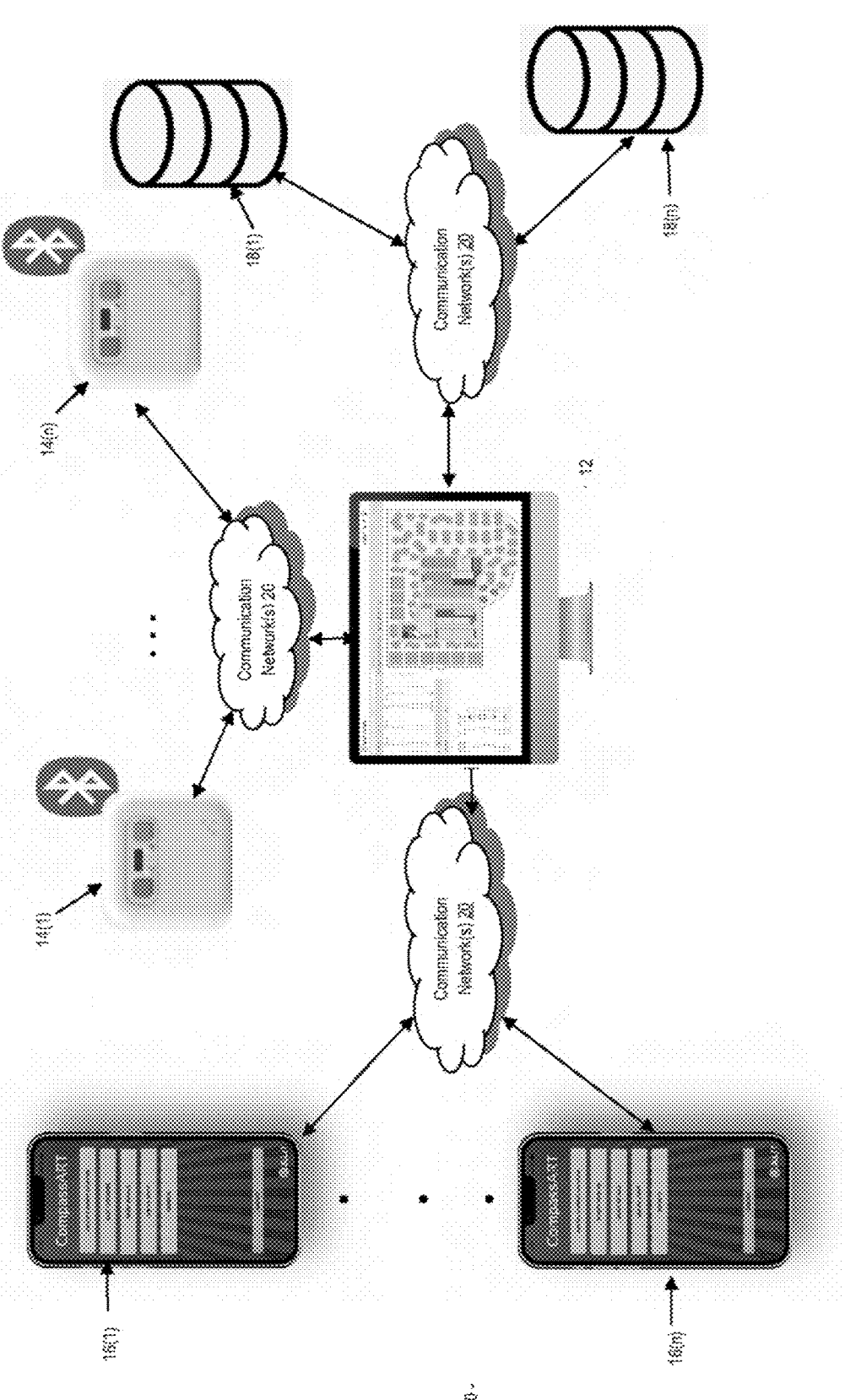
FIG. 1 is a block diagram of an environment with an example of a real-time asset management system managing a plurality of mobile assets.

An environment 10 with an exemplary a real-time asset management computing system 12 is shown in FIGS. 1-2A. In this example, the environment 10 includes the real-time asset management computing system 12, a plurality of assets 14(1)-14($n$), a plurality of client devices 16(1)-16($n$), and a plurality of asset information servers 18(1)-18($n$), although the environment may comprise other types and/or numbers of other systems, devices, components, and/or other elements in other configurations. This technology provides a number of advantages including providing systems, methods, and non-transitory computer readable media that provide effective real-time interactive management of assets in an environment.

Referring to more specifically to FIGS. 1-2A, in this example, the real-time asset management computing system 12 includes one or more processor(s) 22, a memory 24, and/or a communication interface 26, which are coupled together by a bus or other communication link 28, although the real-time asset management computing system 12 can include other types and/or numbers of elements in other configurations.

The processor(s) 22 of the real-time asset management computing system 12 may execute programmed instructions stored in the memory of the real-time asset management computing system 12 for any number of functions and other operations as illustrated and described by way of the examples herein. The processor(s) 22 of the real-time asset management computing system 12 may include one or more CPUs or general purpose processors with one or more processing cores, for example, although other types of processor(s) can also be used.

The memory 24 of the real-time asset management computing system 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Accordingly, the memory 24 of the real-time asset management computing system 12 can store one or more applications that can include computer executable instructions that, when executed by the real-time asset management computing system 12, cause the real-time asset management computing system 12 to perform actions, such as to enable real time interactive management of one or more assets 14(1)-14($n$) with one or more client devices 16(1)-16($n$) and one or more asset information servers 18(1)-18($n$) in the environment 10, and other actions as described and illustrated in the examples below with reference to FIGS. 1-9. The application(s) can be implemented as modules, programmed instructions or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the real-time asset management computing system 12 itself, may be located in virtual server(s) running in a cloud-based computing environment rather than being tied to one or more specific physical computing devices. Also, the application(s) may be running in one or more virtual machines (VMs) executing on the real-time asset management computing system 12. Additionally, in one or more embodiments of this technology, virtual machine(s) running on the real-time asset management computing system 12 may be managed or supervised by a hypervisor.

In this particular example, the memory 24 of the real-time asset management computing system 12 may include a tracking and operations module 30, a user manual module 32, an update module 34, and a service module 36 which may be executed as illustrated and described by way of the examples herein, although the memory 24 can for example include other types and/or numbers of modules, platforms, algorithms, programmed instructions, applications, or databases for implementing examples of this technology.

The tracking and operations module 30 may comprise executable instructions that are configured to identify and track a location of each of the assets 14(1)-14($n$) as well as monitor and store a time each of the assets 14(1)-14($n$) is away from a stored designated home location in real time and execute other operations and/or functions as illustrated and described in greater detail by way of the examples herein, although this module may have executable instructions that are configured to execute other types and/or functions or other operations to facilitate examples of this technology, such as determining or otherwise detecting when the assets 14(1)-14($n$) are in operational use and restricting any operations and/or other functions which can be performed on the corresponding one of the assets 14(1)-14($n$) when determined to be in operational use by way of example.

The user manual module 32 may comprise executable instructions that are configured to identify and provide any user manual data for the assets 14(1)-14($n$), as illustrated and described in greater detail by way of the examples herein, although this module may have executable instructions that are configured to execute other types and/or functions or other operations to facilitate examples of this technology, such as identifying the type of display capabilities at the requesting one of the client device 16(1)-16($n$) and adjusting the identified user manual data in a format based on the identified type of display capabilities by way of example.

The update module 34 may comprise executable instructions that are configured to determine a system update status for the assets 14(1)-14($n$) and download and provide any available programmable update instructions as illustrated and described in greater detail by way of the examples herein, although this module may have executable instructions that are configured to execute other types and/or functions or other operations to facilitate examples of this technology.

The service module 36 may comprise executable instructions that are configured to execute one or more service operations on assets, such as executing one or more diagnostic operations to identify any operational issues with an asset, initiating one or more service operations based on any identified operational issues, and/or identifying any applicable warranties and initiating any necessary warranty claims with one or more third party servers or computing devices by way of example only as illustrated and described in greater detail by way of the examples herein, although this module may have executable instructions that are configured to execute other types and/or service functions or other operations to facilitate examples of this technology.

The communication interface 26 of the real-time asset management computing system 12 operatively couples and communicates between the real-time asset management computing system 12 and the one or more of assets 14(1)-14(n), the one or more of the client devices 16(1)-16(n), and the one or more asset information servers 18(1)-18(n), although other types and/or numbers of connections and/or communication networks can be used.

While the real-time asset management computing system 12 is illustrated in this example as including a single device, the real-time asset management computing system 12 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the real-time asset management computing system 12.

Additionally, one or more of the devices that together comprise the real-time asset management computing system 12 in other examples can be standalone devices or integrated with one or more other devices or apparatuses, such as in one of the server devices or in one or more computing devices for example. Moreover, one or more of the devices of the real-time asset management computing system 12 in these examples can be in a same or a different communication network including one or more public, private, or cloud networks, for example.

Although an exemplary real-time asset management computing system 12 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in this real-time asset management computing system 12, such as the real-time asset management computing system 12, for example, may be configured to operate as virtual instances on the same physical machine. In other words, by way of example one or more of the real-time asset management computing system 12 may operate on the same physical device rather than as separate devices communicating through communication network(s). Additionally, there may be more or fewer real-time asset management computing system 12 than illustrated in FIG. 3.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Referring to FIGS. 1 and 2B, the plurality of assets 14(1)-14(n) may comprise a variety of different types and/or numbers of systems, devices, or other things in the environment 10, such as a variety of different types and/or numbers of medical equipment in a multi-floor medical building environment by way of example only. Each of the assets 14(1)-14(n) may be identified by one or more asset identifiers, such as an asset code or id and an asset class which may be assigned when the asset is registered by way of example only, although other types and/or number of identifiers can be used. In this example, the real-time assessment management computing system 12 has a table or other manner for identifying types of related assets with comparison rules or other instructions and/or stored tables or databases, such as different types of spectrometers, x-ray machines, or MRI machines by way of example, although other manners for categorizing the assets in different defined categories based on the environment can be used. In this example, each of the assets 14(1)-14(n) at least have the same following structure and operation as shown in the example of the asset device 14(1) shown in FIG. 2B, although assets with other types and/or numbers of other systems, devices, components, and/or other elements with other structures and/or operations may be used. Additionally, in this example, the asset 14(1) has one or more processors 42, a memory 44, a communication interface, and a global positioning system (GPS) device 48 which are coupled together by a bus or other communication link 50, although each asset could have other types and/or numbers of systems, devices, components and/or other elements in other configurations. For example, one or more of the assets 14(1)-14(n) could have other tracking systems and/or the tracking systems or GPS could be separate devices that are secured to one or more of the assets 14(1)-14(n).

Referring to FIGS. 1 and 2C, the plurality of client devices 16(1)-16(n) in this example includes any type of computing device that can participate in real-time interactive management of assets in an environment 10 with a client asset management application 64, such as mobile computing devices, desktop computing devices, laptop computing devices, tablet computing devices, virtual machines (including cloud-based computers), or the like. In this example, each of the client devices 16(1)-16(n) at least have the same following structure and operation as shown in the example of the client device 16(1) shown in FIG. 2C, although client devices with other types and/or numbers of other systems, devices, components, and/or other elements may be used. Additionally in this example, the client device 16(1) includes one or more processor 52, a memory 54, a communication interface 56, an input device 58, and a display device 60, which are coupled together by a bus or other communication link 62, types and/or numbers of systems, devices, components, or other elements in other configurations. Additionally, in this example the memory 34 includes an asset management client application 64 which enables the client 16(1) to interact with the real-time assessment management computing system 12 and one or more of the assets 14(1)-14(n) as illustrated and described by way of the examples herein, although the memory 54 can include other programmed instructions, modules, applications, or other data for example.

The plurality of asset information servers 18(1)-18(n) in this example includes one or more processors, a memory, and a communication interface, which are coupled together by a bus or other communication link, although other numbers and/or types of network devices could be used. In this example, the asset information servers 18(1)-18(n) are located at different locations, are for different entities, and may each process requests received from the real-time assessment management computing system 12 and/or the client devices 16(1)-16(n) via the communication network (s) 20. Various data and other applications may be operating on the real-time assessment management computing system 12 and transmitting data (e.g., files or Web pages) to the real-time assessment management computing system 12 and/or the client devices 16(1)-16(n). The asset information servers 18(1)-18(n) may be hardware or software or may represent a system with multiple servers in a pool, which may include internal or external networks.

An exemplary method for providing real-time interactive management of one or more of the assets 14(1)-14(n) in the environment 10 with the real-time asset management computing system 12 and one or more of the client devices 16(1)-16(n) will now be described with reference to FIGS. 1-9.

Figure 3:
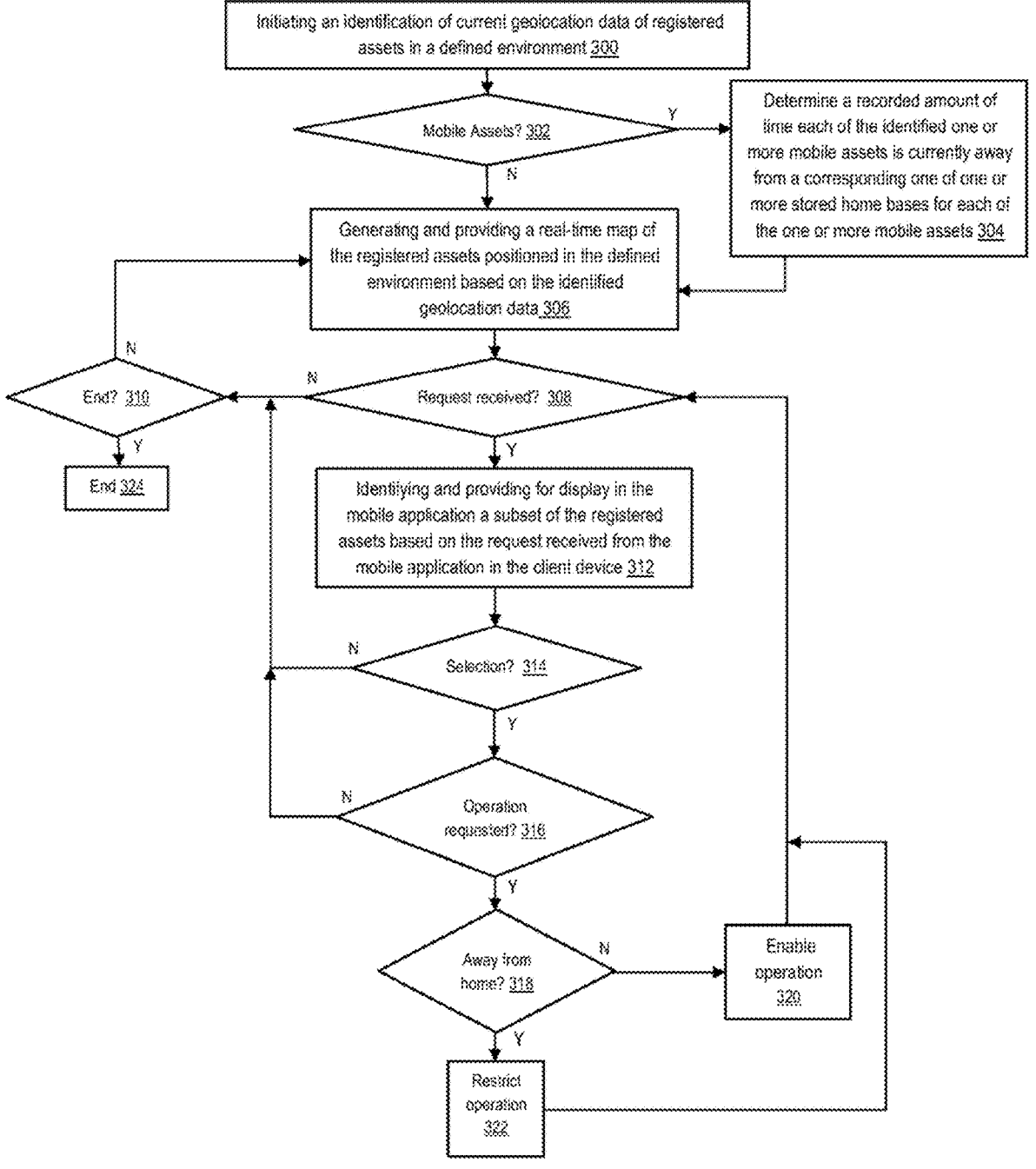
FIG. 3 is a flowchart of an example of a method for providing real-time interactive management of assets in an environment.
Figure 4:
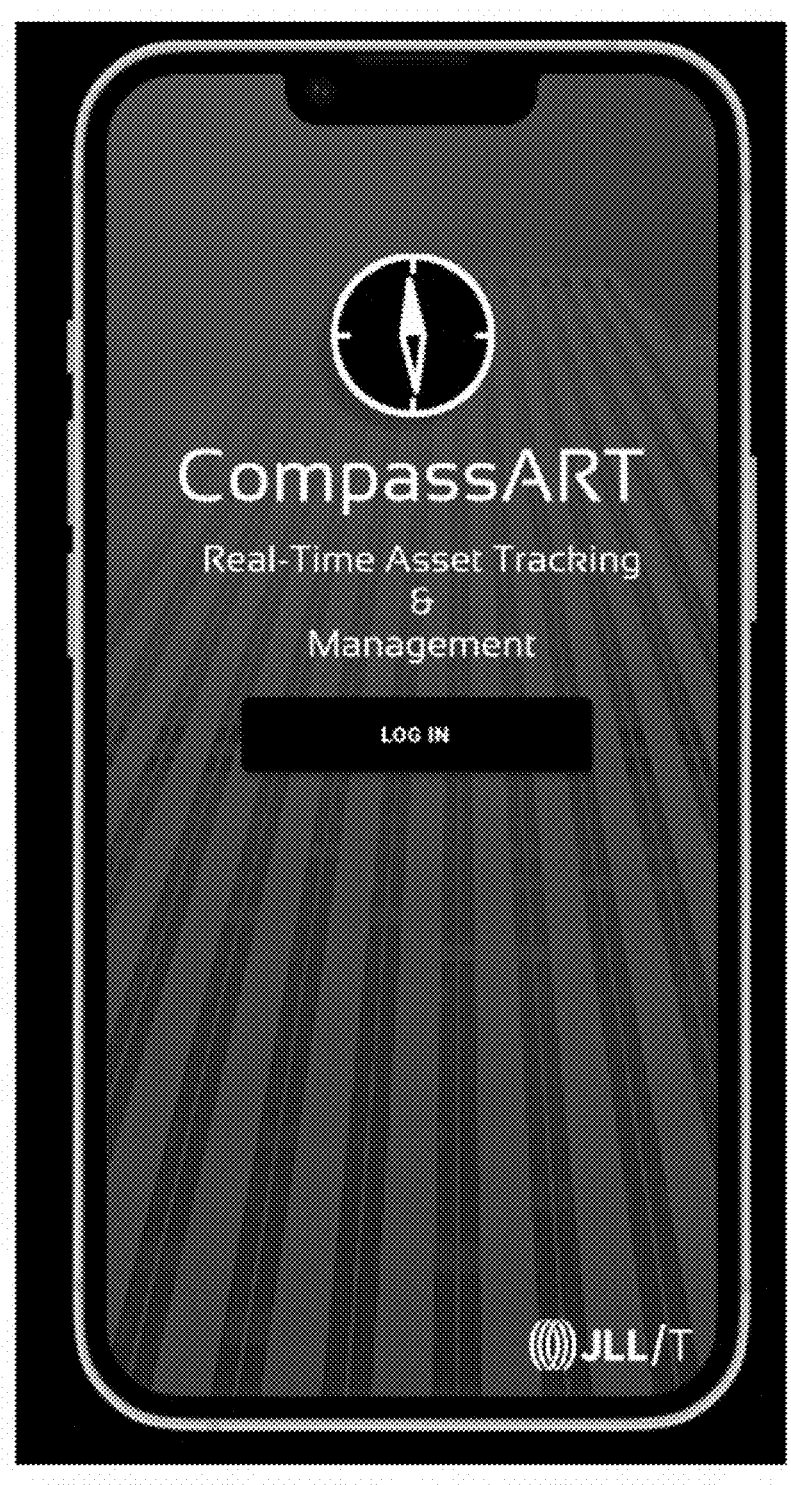
FIG. 4 is a screen shot of an exemplary login interface in an asset management client application on one of the client devices.

Referring more specifically to FIG. 3, in this example in step 300, the real-time asset management computing system 12 receives a login request from an exemplary login interface of an asset management client application 64 executing on one of the client devices 16(1)-16(n) as shown by way of example in FIG. 4, although other manners for starting may be used. In response to the login request, in step 300 the real-time asset management computing system 12 executes the tracking and operations module 32 which initiates an identification of current real time geolocation data of registered assets 14(1)-14(n) in the defined environment 10 in this example, although other manners for initiating this identification may be used. Additionally, in this example, the defined environment 10 comprises a medical building with a floor with a plurality of separated spaces as shown in the generated map for the display of the one of the client devices 16(1)-16(n) in FIGS. 5-7, although the defined environment can comprise other types of structures with other numbers of buildings and/or floors as well as other types of areas for other types of environments, such as government or higher education facility environments, in other examples. Further, in this example the assets 14(1)-14(n) comprise a plurality of medical device assets which have been previously registered with the real-time asset management computing system 12 based on one of a plurality of asset codes or asset IDs, one of a plurality of asset classes, and a status with respect to mobility, although other types and/or numbers of other asset identifiers may be used, other types and/or numbers of assets, and the assets may or may not be registered.

Figure 9:
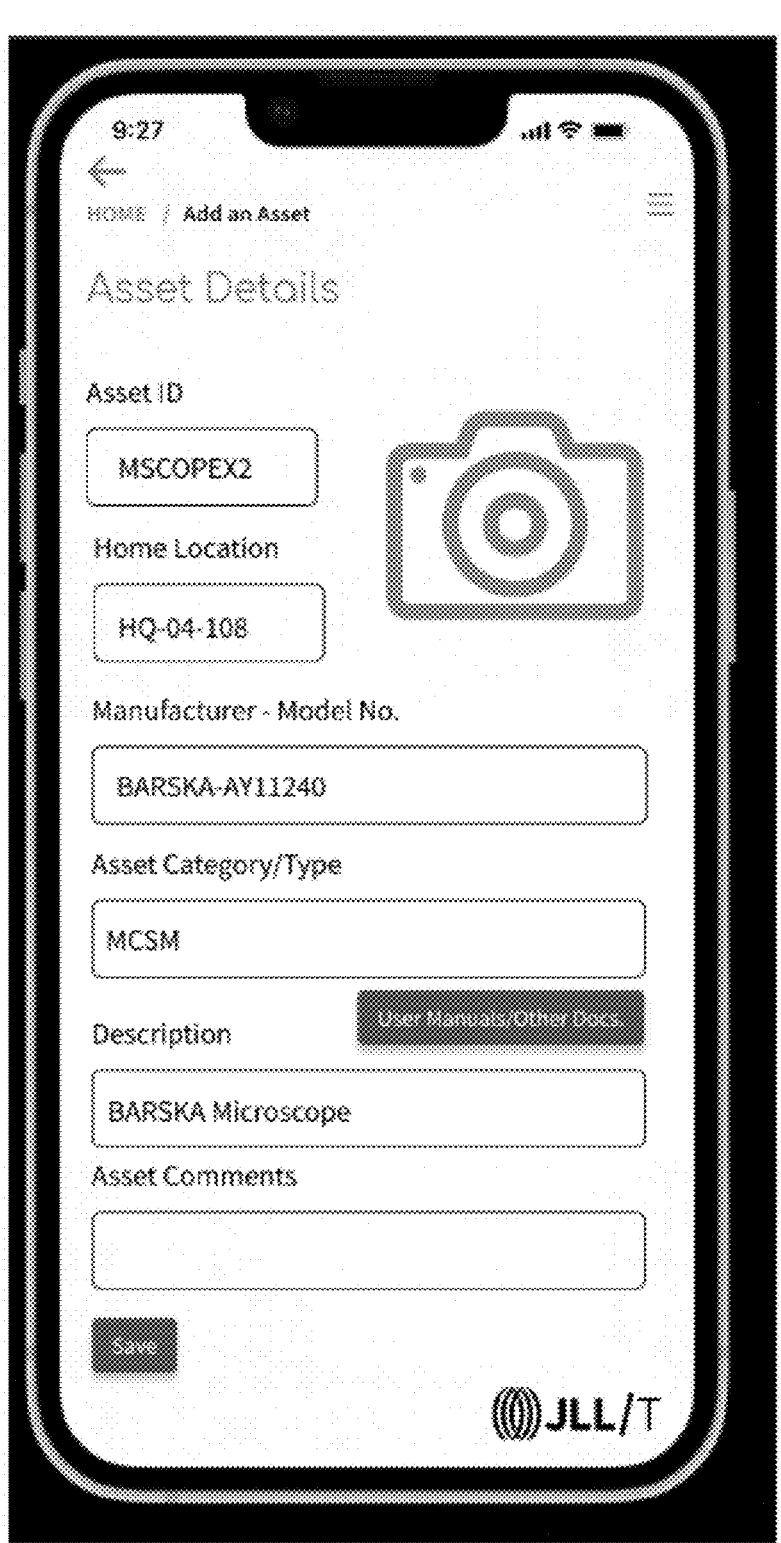
FIG. 9 is a screen shot of an exemplary asset registration interface for mobile assets in the asset management client application on one of the client devices.

In step 302, the real-time asset management computing system 12 determines if any of the identified registered assets 14(1)-14(n) in the defined environment 10 are mobile assets based on the initial registration of each of the assets 14(1)-14(n) in this example, although other manners for determining if one or more of the registered assets 14(1)-14(n) are mobile assets can be used, such as storing home base location data for each of the registered assets 14(1)-14(n) and detecting if any of the registered has moved from the corresponding stored home base location data, i.e. is mobile, by way of example. The registration or updating of information on the assets 14(1)-14(n) can be managed by the real-time asset management computing system 12 via the asset management client application 64 executing on one of the client devices 16(1)-16(n) as shown in FIG. 9 by way of example only. If in step 302 the real-time asset management computing system 12 determines there are one or more mobile assets in the registered assets 14(1)-14(n), then the yes branch is taken to step 304.

In step 304, the real-time asset management computing system 12 determines a recorded amount of time any of the identified one or more mobile assets in the registered assets 14(1)-14(n) is currently away from corresponding stored home base location data for each of the one or more mobile assets. In this example, real-time asset management computing system 12 monitors each of the mobile assets in the registered assets 14(1)-14(n) and in real-time is able to detect when any are away from the corresponding stored home base location data and begin to record that time away as well as detect when returned.

If in step 302 the real-time asset management computing system 12 determines there are not any mobile assets in the registered assets 14(1)-14(n), then the No branch is taken to step 306 or is arrived at from step 304 as discussed above.

In 306, the real-time asset management computing system 12 generates and provides a graphical user interface comprising a real-time map of the registered assets 14(1)-14(n) positioned and illustrated in the defined environment based on the identified geolocation data to the asset management client application 64 executing on one of the client devices 16(1)-16(n), although other manners for providing the real-time map of the registered assets 14(1)-14(n) as well as providing other information can be executed. The real-time asset management computing system 12 may also determine a display capability of the one of the client devices 16(1)-16(n) and then adjust the generated real-time map provided for display in the asset management client application 64 based on the determined display capability one of the client devices 16(1)-16(n).

Figure 5:
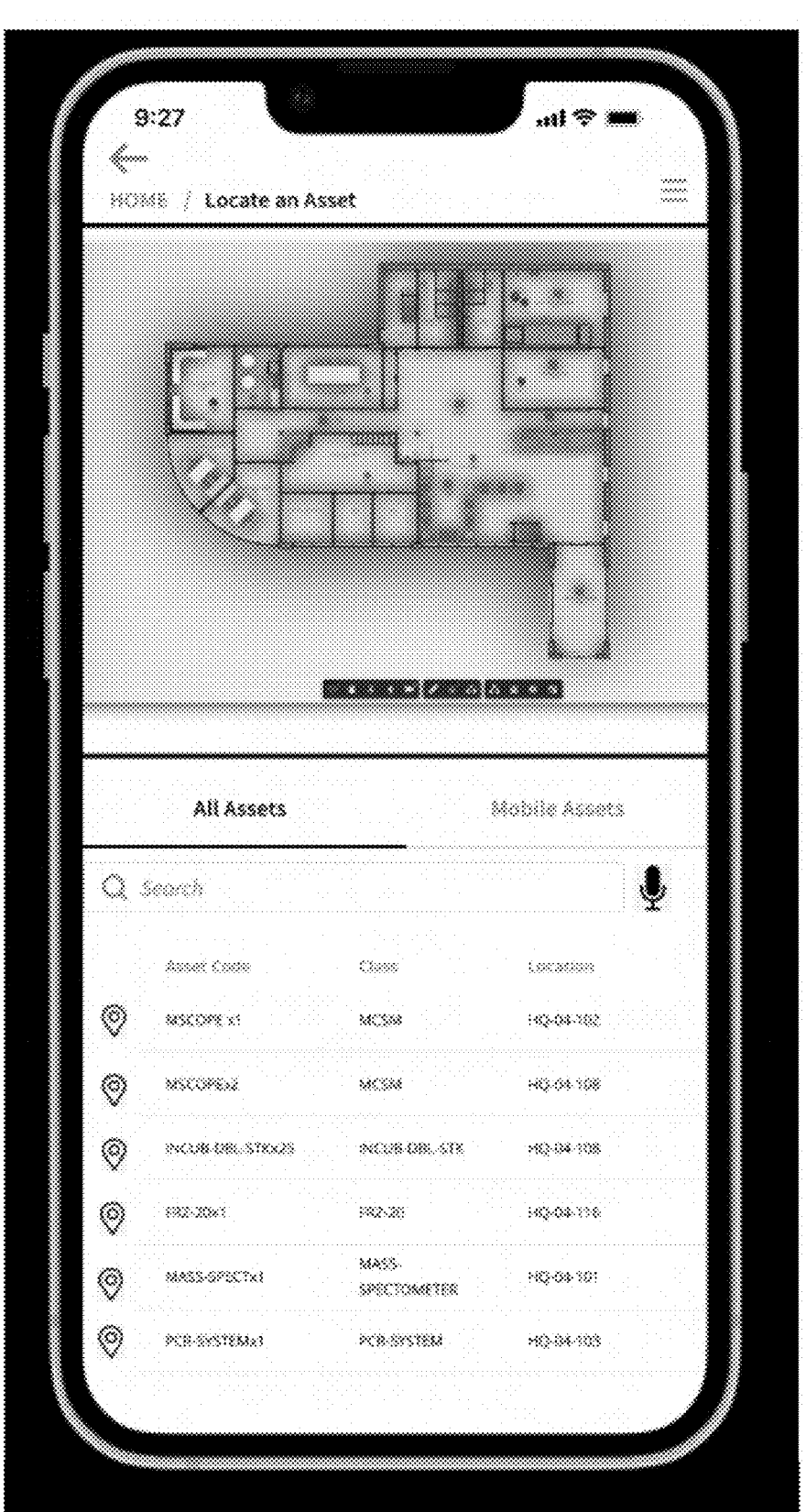
FIG. 5 is a screen shot of an exemplary locator interface focused on all registered assets in the asset management client application on one of the client devices.
Figure 6:
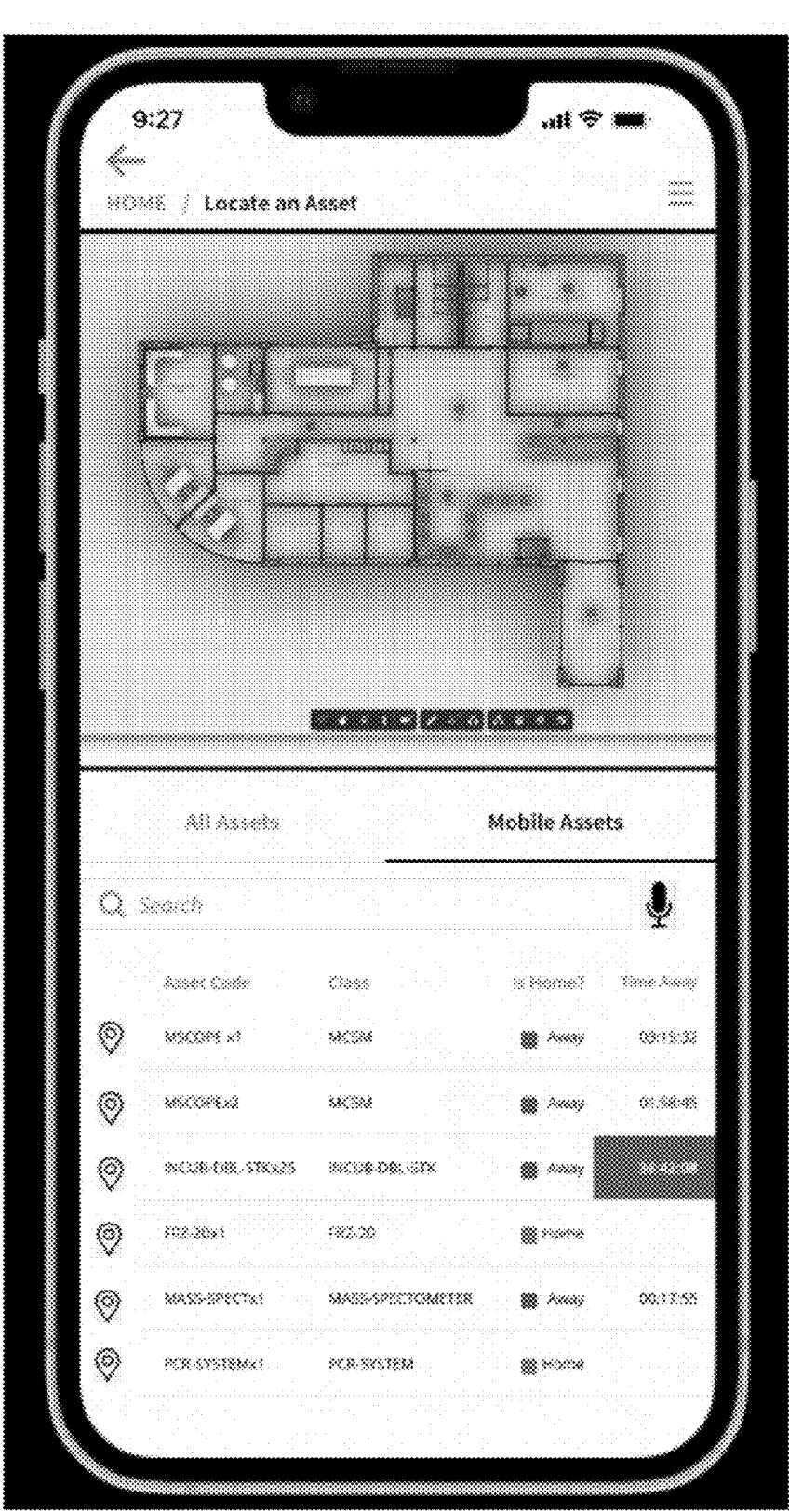
FIG. 6 is a screen shot of an exemplary location identifier interface focused on mobile assets in the asset management client application on one of the client devices.
Figure 7:
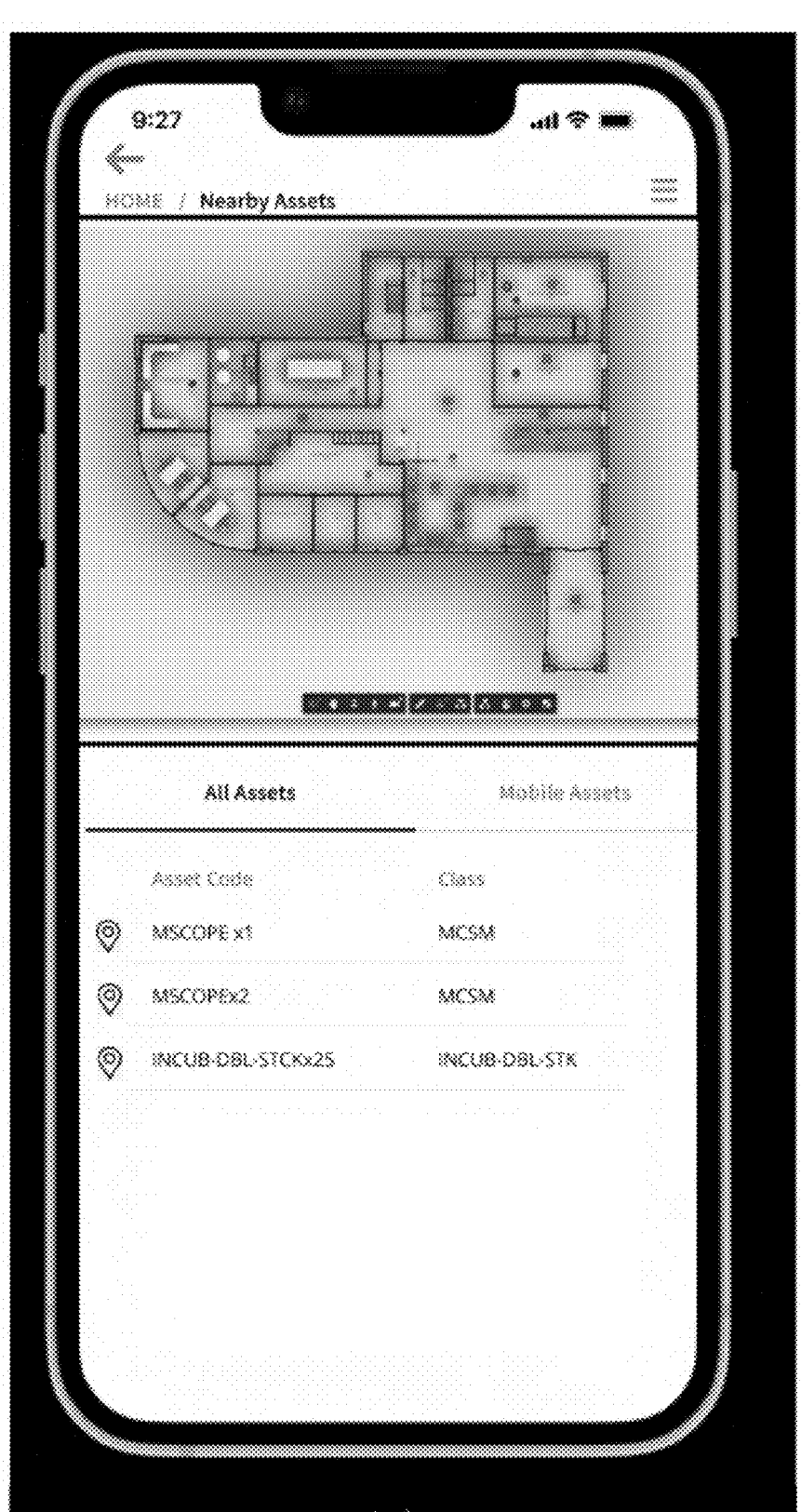
FIG. 7 is a screen shot of an exemplary proximity interface for registered assets in the asset management client application on one of the client devices.

In this example, the real-time asset management computing system 12 also generates and provides with the map a table with an executable "All Assets" tab which provides the identified assets 14(1)-14(n) and another executable 'Mobile Assets tab", see for example in FIGS. 5-7, which provides any mobile assets in the registered assets 14(1)-14(n), although the table could provide other types of information in other manners. Additionally, in this example the "All Assets" tab provides a list of each of the assets 14(1)-14(n) listed out based on one of a plurality of asset codes or asset IDs, one of a plurality of assets classes, and a determined current location from the identified geolocation data, although other types and/or numbers of asset identifiers as well as other types of information may be provided. Further, in this example the "Mobile Assets" tab provides a list of each of the mobile assets in the registered assets 14(1)-14(n) listed out based on one of a plurality of asset codes or asset IDs, one of a plurality of assets classes, a location status, such as home or away status with respect to corresponding stored home base data for each of the mobile assets in the registered assets 14(1)-14(n) by way of example, and a recorded time away from the corresponding stored home base data if not at the corresponding stored home base data, although other types and/or numbers of asset identifiers as well as other types of information may be provided. In this example, the real-time asset management computing system 12 is configured to utilize the determined location status, the time away, and other assets identifier information correlated against stored operation rules for dynamically modifying, restricting, or otherwise limiting available executable operations when needed to facilitate management interaction and restriction with respect to the mobile assets in the registered assets 14(1)-14(n) as illustrated and described by way of examples herein.

In step 308, the real-time asset management computing system 12 determines whether a request which includes one or more request parameters is received with respect to one or more of the registered assets 14(1)-14(n) from one of the client devices 16(1)-16(n). By way of example, the request parameters may be for one or more of the assets 14(1)-14(n) where one or more may also be mobile assets. In this example, the request is for two of the assets 14(1)-14(n) with one being a particular request for a specific incubator with the Asset Code and Asset Class of INCUB-DBL_STK and the other request is for a microscope under Asset class MCSM.

If in step 308 the real-time asset management computing system 12 determines the request from one of the client devices 16(1)-16(n) has not been received, then the No branch is taken to step 310. In step 310, the real-time asset management computing system 12 determines whether this process should end at this time based, for example, on the one of the client devices 16(1)-16(n) requesting shutdown by way of example, although other manners for making this determination can be used. If the real-time asset management computing system 12 determines this process should end, then the No branch is taken to step 324 where this example of the process ends. If the real-time asset management computing system 12 determines this process is not ending at this time, then the Yes branch is taken back to step 306 as described earlier.

If back in step 308 the real-time asset management computing system 12 determines the request from one of the client devices 16(1)-16(n) has been received, then the Yes branch is taken to step 312. In step 310, the real-time asset management computing system 12 identifies and provides for display in the client asset management application 64 a subset of the registered assets 14(1)-14(n) based on the request received from the client asset management application 64 in the client device as illustrated by way of example on FIG. 7.

Accordingly, for the prior exemplary request, the real-time asset management computing system 12 identifies that the incubator with the Asset Code and Asset Class of INCUB-DBL_STK is a mobile asset and is identified in real-time as being away from corresponding stored home base data, such as a particular storage location for incubators in the environment 10, for: 36 hours; 42 minutes; and 8 seconds as shown in FIG. 6. Additionally, the real-time asset management computing system 12 identifies that microscope under Asset Class MCSM has two options nearby, i.e. within a set proximity which can be based on distance or other parameters, such as not distance based, but on being located on the same floor of a building by way of example, which are identified as MSCOPEx1 and MSCOPEx2. In this example, MSCOPEx1 and MSCOPEx2 are both mobile assets in the registered assets 14(1)-14(n) and are away from corresponding stored home base data, such as a particular storage location for microscopes, for: 3 hours; 15 minutes; and 32 seconds and 1 hour; 58 minutes and 45 seconds as shown in FIG. 6.

In step 314, the real-time asset management computing system 12 determines whether the one of the client devices 16(1)-16(n) has selected one of the identified assets 14(1)-14(n) to initiate any operations. If in step 314, the real-time asset management computing system 12 determines has not selected one of the identified assets 14(1)-14(n) after a set period of time in this example (although other manners for making this determination can be used), then the No branch is taken back to step 310 as described earlier. If in step 314, the real-time asset management computing system 12 determines has selected one of the identified assets 14(1)-14(n) after a set period of time, then the Yes branch is taken to step 316.

In step 316, the real-time asset management computing system 12 determine if one of a plurality of executable operations with respect to one of the identified assets 14(1)-14(n) has been requested by the one of the client devices 16(1)-16(n). If in step 316 the real-time asset management computing system 12 determine one of the plurality of operations has not been requested after a set period of time (although other manners for making this determination can be used), then the No branch is taken back to step 310 as described earlier. If in step 316 the real-time asset management computing system 12 determine one of the plurality of operations has been requested, then the Yes branch is taken back to step 318.

In step 318, the real-time asset management computing system 12 determines whether the selected one the assets 14(1)-14(n) for the requested one of the executable operations is away from the corresponding home base data for the selected one the assets 14(1)-14(n). If in step 318, the real-time asset management computing system 12 determines the selected on the assets 14(1)-14(n) is away from the corresponding home base data, then the No branch is taken to step 322. In step 322, real-time asset management computing system 12 determines whether the selected one of the executable operation is restricted based on the determined location status, the time away, and other assets identifier information correlated against stored operation rules for dynamically modifying, restricting, or otherwise limiting available executable operations of the selected one of the assets 14(1)-14(n). In this example, the application of the modifications, restrictions or other limitations is based on the mobile status of an asset, although in other examples the application can be based on non-mobile assets based on other types and/or numbers of determined factors or other characteristics, such as detecting a current operational status of the selected one of the assets 14(1)-14(n) and then limiting the one or more selected executable operations based on the detected operational status based on other stored rules in the real-time asset management computing system 12.

If, however, back in step 318, the real-time asset management computing system 12 determines the selected one of the assets 14(1)-14(n) is not away from the corresponding home base data, then the Yes branch is taken to step 320. In step 320, real-time asset management computing system 12 does not limit the one or more selected executable operations which are executed before proceeding to step 308 as described earlier. By way of example, the real-time asset management computing system 12 also can determine based on the asset identifier as well as the location status and real-time recorded time away different levels of limits or other restrictions to impose with respect to executable operations for these assets 14(1)-14(n). For example, the real-time asset management computing system 12 may determine that based on the type of the selected one the assets 14(1)-14(n) and the time away from stored home base location data without any further movement above a stored threshold time is an indication in a rule that the selected one the assets 14(1)-14(n) is not in current use, but has not been properly returned and is available for all executable operations.

Examples of this technology are also configured to manage and determine a level of enablement of a variety of different types of executable operations at the assets 14(1)-14(n) with the real-time asset management computing system 12. For example, the real-time asset management computing system 12 may determine based on stored executable rules that for an incubator INCUB-DBL_STK as the selected one of the assets 14(1)-14(n) which is determined to be in an away state that the available executable operations via the mobile application 64 in the one of the client devices 16(1)-16(n) would be very limited or entirely restricted because of the likelihood that the incubator in the determined away state is likely in use with a premature baby. In another example, the real-time asset management computing system 12 may determine based on stored executable rules that for one of the microscopes MSCOPEx1 or MSCOPEx2 as the selected one of the assets 14(1)-14(n) which is determined to be in an away state that the available executable operations via the mobile application 64 in the one of the client devices 16(1)-16(n) would be more limited, but not entirely restricted because of the nature of the device.

Figure 8:
FIG. 8 is a screen shot of an exemplary asset interaction interface for mobile assets in the asset management client application on one of the client devices.

In other examples, the requested executable operation via the mobile application 64 in the one of the client devices 16(1)-16(n) may be to obtain more specific asset information data, such as a user manual for the particular manufacturing type and year of the selected one of the assets 14(1)-14(n). Accordingly, in this example the real-time asset management computing system 12 may execute the user manual operations module 32 which is configured enable engagement of a scanner link for a code scanner or other imaging device in the one of the client devices 16(1)-16(n) to scan an identification code on the selected one of the subset of registered assets 14(1)-14(n) via the mobile application 64 in the one of the client devices 16(1)-16(n) as shown in FIG. 8. In response to receiving an image or other scan of a bar code or other identifier of the selected one of the subset of registered assets 14(1)-14(n), the real-time asset management computing system 12 is able to identify and obtain asset detail data, such as a owner's manual for the particular type and year of the selected one of the subset of registered assets 14(1)-14(n), from one or more of the asset information servers 18(1)-18(n). The real-time asset management computing system 12 transmits the obtained asset detail data for interactive access in the asset management client application 64 in the one of the client devices 16(1)-16(n). The real-time asset management computing system 12 may also obtain display capability information for the one of the client devices 16(1)-16(n) and then reformat the obtained asset detail data for more enhanced interactive access in the asset management client application 64 in the one of the client devices 16(1)-16(n).

In further examples, the requested executable operation via the mobile application 64 in the one of the client devices 16(1)-16(n) may be to update the asset details for one of the assets 14(1)-14(n). Accordingly, in this example in response to receiving a requested executable operation to update asset detail via the mobile application 64 in the one of the client devices 16(1)-16(n), then the real-time asset management computing system 12 may be configured to enable an imaging link in the asset management client application 64 to enable an imager in the one of the client devices 16(1)-16(n) as shown in FIG. 9. In response to receiving the captured image from the one of the client devices 16(1)-16(n), then the real-time asset management computing system 12 can update and store the image and/or any other provided update data for the one of the assets 14(1)-14(n).

In yet other examples, the requested executable operation via the mobile application 64 in the one of the client devices 16(1)-16(n) may be to determine a current service status of the selected one of the subset of registered assets 14(1)-14(n). In response to receiving this requested executable operation, the real-time asset management computing system 12 executes the service module 36 in this example which identifies any applicable warranty data for the one of the assets 14(1)-14(n) from one or more of the asset information servers 18(1)-18(n). The real-time asset management computing system 12 may also obtain and determine a current service status of the one of the assets 14(1)-14(n), identify any issue, identify any applicable warranty, and at least begin to automate the request not only for the necessary service, but also to initiate and any electronic warranty claim submission to a necessary third party server.

In other additional examples, the requested executable operation via the mobile application 64 in the one of the client devices 16(1)-16(n) may be to determine a system update status of the selected one of the subset of registered assets 14(1)-14(n). In response to receiving this requested executable operation, the real-time asset management computing system 12 executes the update module 34 in this example to determine a current update on the status of the selected one of the subset of registered assets 14(1)-14(n) from stored or obtained update records, although others manners for determining if an update is needed may be used. Based on determined update status for the selected one of the subset of registered assets 14(1)-14(n), the real-time asset management computing system 12 identifies an appropriate one of the asset information servers 18(1)-18(n) for the selected one of the subset of registered assets 14(1)-14(n) and may initiate the one or more outstanding updates on the selected one of the subset of registered assets 14(1)-14(n) when out of date. These examples of executable operations is for illustration purposes only to highlight not only the available executable operations, but the different manners in which they can be managed and implemented.

As illustrated and described by way of the examples above, this technology provides methods, non-transitory computer readable medium, and systems that enable real-time interactive management of assets in an environment. Examples of this technology are able to track a location of any mobile asset in a set of assets including an amount of time away any of the mobile assets is away from a designated home base to further enhance the ability of an operator to have an understanding of and manage any interaction with the mobile asset. Additionally, examples of this technology are configured to identify and obtain owner's manual data to facilitate assisting an operator who may not be familiar with how to operate a particular type of asset. Examples of this technology also are able to identify and manage any outstanding system updates for an asset. Further, examples of this technology are configured to identify and assist with or manage any necessary warranty and other service and/or repairs of an asset. This interactive management also enables an operator to obtain a holistic view around and enable management of current necessary and/or desired interactions as well as of the lifecycle of the asset which was not previously possible with existing systems.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

initiating, by a computing device, an identification of current geolocation data of registered assets in a defined environment;

generating and providing, by the computing device, a real-time map of the registered assets positioned in the defined environment based on the identified geolocation data;

identifying, by the computing device, for display in an asset management client application a subset of the registered assets based on a request received from the asset management client application in the client device; and enabling, by the computing device, real time interaction from the asset management client application in the client device with a plurality of executable operations for a selected one of the subset of registered assets, wherein the enabling real time interaction further comprises:

providing, by the computing device, in the asset management client application in the client device engagement of a user assistance link for the selected one of the subset of registered assets;

obtaining, by the computing device, one or more types of asset assistance data from one or more remote server devices associated with the selected one of the subset of registered assets in response to notification of engagement of the user assistance link; and transmitting, by the computing device, the one or more types of asset assistance data for interactive access in the asset management client application in the client device.

2. The method as set forth in claim 1 wherein the initiating the identification of the current geolocation data of the registered assets in the defined environment, further comprises:

identifying, by the computing device, which of the registered assets comprise one or more mobile assets; and determining, by the computing device, a recorded amount of time any of the identified one or more mobile assets is currently away from a corresponding one of one or more stored home bases for each of the one or more mobile assets.

3. The method as set forth in claim 2 wherein the providing the map of the registered assets positioned in the defined environment further comprises:

providing, by the computing device, a table of a current home-or-away status and the recorded amount of time currently away from the corresponding one of one or more stored home bases for each of the one or more mobile assets.

4. The method as set forth in claim 2 further comprising:

limiting, by the computing device, the enabled operational aspects to a subset when the selected one of the subset of registered assets is one of the one or more mobile assets and is currently away from the corresponding one of the one or more stored home bases.

5. The method as set forth in claim 1 wherein the enabling real time interaction further comprises:

providing, by the computing device, in the asset management client application in the client device engagement of a scanner link for a code scanner to scan an identification code on the selected one of the subset of registered assets;

obtaining, by the computing device, asset detail data based on a received scan of the identification code from one or more remote server devices associated with the selected one of the subset of registered assets; and transmitting, by the computing device, the obtained asset detail data for interactive access in the asset management client application in the client device.

6. The method as set forth in claim 1 further comprising:

determining, by the computing device, a display capability of the client device; and adjusting, by the computing device, the asset assistance data provided for display in the asset management client application based on the determined display capability of the client device.

7. The method as set forth in claim 1 wherein the enabling real time interaction further comprises:

enabling, by the computing device, an imaging link in the asset management client application to enable an imager in the client device; and obtaining and storing, by the computing device, an image of the selected one of the subset of registered assets in response to notification of engagement of the imaging link.

8. The method as set forth in claim 1 wherein the enabling real time interaction further comprises:

determining, by the computing device, a system update status of the selected one of the subset of registered assets; and updating, by the computing device, the selected one of the subset of registered assets when the determining indicates the system update status of the one of the identified registered assets is out of date.

9. A method comprising:

initiating, by a computing device, an identification of current geolocation data of registered assets in a defined environment;

generating and providing, by the computing device, a real-time map of the registered assets positioned in the defined environment based on the identified geolocation data;

identifying, by the computing device, for display in an asset management client application a subset of the registered assets based on a request received from the asset management client application in the client device; and enabling, by the computing device, real time interaction from the asset management client application in the client device with a plurality of executable operations for a selected one of the subset of registered assets, wherein the enabling real time interaction further comprises:

determining, by the computing device, a current service status of the selected one of the subset of registered assets;

identifying, by the computing device, any applicable warranty data based on the determined current service status; and initiating, by the computing device, a request for any required service on the selected one of the subset of registered assets covered by the identified applicable warranty data based on the determined current service status.

10. An asset management computing system comprising: one or more processors;

a memory comprising programmed instructions stored thereon, the one or more processors configured to be capable of executing the stored programmed instructions to:

initiate an identification of current geolocation data of registered assets in a defined environment;

generate and provide a real-time map of the registered assets positioned in the defined environment based on the identified geolocation data;

identify for display in an asset management client application a subset of the registered assets based on a request received from the asset management client application in the client device; and enable real time interaction from the asset management client application in the client device with a plurality of executable operations for a selected one of the subset of registered assets, wherein for the enable real time interaction, the one or more processors are further configured to be capable of executing the stored programmed instructions to:

provide in the asset management client application in the client device engagement of a user assistance link for the selected one of the subset of registered assets;

obtain one or more types of asset assistance data from one or more remote server devices associated with the selected one of the subset of registered assets in response to notification of engagement of the user assistance link; and transmit the one or more types of asset assistance data for interactive access in the asset management client application in the client device.

11. The system as set forth in claim 10 wherein for the initiate the identification of the current geolocation data of the registered assets in the defined environment, the one or more processors are further configured to be capable of executing the stored programmed instructions to:

identify device, which of the registered assets comprise one or more mobile assets; and determine a recorded amount of time any of the identified one or more mobile assets is currently away from a corresponding one of one or more stored home bases for each of the one or more mobile assets.

12. The system as set forth in claim 11 wherein for the provide the map of the registered assets positioned in the defined environment, the one or more processors are further configured to be capable of executing the stored programmed instructions to:

provide a table of a current home-or-away status and the recorded amount of time currently away from the corresponding one of one or more stored home bases for each of the one or more mobile assets.

13. The system as set forth in claim 11 wherein the one or more processors are further configured to be capable of executing the stored programmed instructions to:

limit the enabled operational aspects to a subset when the selected one of the subset of registered assets is one of the one or more mobile assets and is currently away from the corresponding one of the one or more stored home bases.

14. The system as set forth in claim 10 wherein for the enable real time interaction, the one or more processors are further configured to be capable of executing the stored programmed instructions to:

provide in the asset management client application in the client device engagement of a scanner link for a code scanner to scan an identification code on the selected one of the subset of registered assets;

obtain asset detail data based on a received scan of the identification code from one or more remote server devices associated with the selected one of the subset of registered assets; and transmit the obtained asset detail data for interactive access in the asset management client application in the client device.

15. The system as set forth in claim 10 wherein the one or more processors are further configured to be capable of executing the stored programmed instructions to:

determine a display capability of the client device; and adjust the asset assistance data provided for display in the asset management client application based on the determined display capability of the client device.

16. The system as set forth in claim 10 wherein for the enable real time interaction, the one or more processors are further configured to be capable of executing the stored programmed instructions to:

enable an imaging link in the asset management client application to enable an imager in the client device; and obtain and store an image of the selected one of the subset of registered assets in response to notification of engagement of the imaging link.

17. The system as set forth in claim 10 wherein for the enable real time interaction, the one or more processors are further configured to be capable of executing the stored programmed instructions to:

determine a system update status of the selected one of the subset of registered assets; and update the selected one of the subset of registered assets when the determining indicates the system update status of the one of the identified registered assets is out of date.

18. An asset management computing system comprising: one or more processors;

a memory comprising programmed instructions stored thereon, the one or more processors configured to be capable of executing the stored programmed instructions to:

initiate an identification of current geolocation data of registered assets in a defined environment;

generate and provide a real-time map of the registered assets positioned in the defined environment based on the identified geolocation data;

identify for display in an asset management client application a subset of the registered assets based on a request received from the asset management client application in the client device; and enable real time interaction from the asset management client application in the client device with a plurality of executable operations for a selected one of the subset of registered assets, wherein for the enable real time interaction, the one or more processors are further configured to be capable of executing the stored programmed instructions to:

determine a current service status of the selected one of the subset of registered assets;

identify any applicable warranty data based on the determined current service status; and initiate a request for any required service on the selected one of the subset of registered assets covered by the identified applicable warranty data based on the determined current service status.

19. A non-transitory computer readable medium having stored thereon instructions comprising executable code which when executed by one or more processors, causes the one or more processors to:

initiate an identification of current geolocation data of registered assets in a defined environment;

generate and provide a real-time map of the registered assets positioned in the defined environment based on the identified geolocation data;

identify for display in an asset management client application a subset of the registered assets based on a request received from the asset management client application in the client device; and enable real time interaction from the asset management client application in the client device with a plurality of executable operations for a selected one of the subset of registered assets, wherein for the enable real time interaction, the executable code when executed by the one or more processors further causes the one or more processors to:

provide in the asset management client application in the client device engagement of a user assistance link for the selected one of the subset of registered assets;

obtain one or more types of asset assistance data from one or more remote server devices associated with the selected one of the subset of registered assets in response to notification of engagement of the user assistance link; and transmit the one or more types of asset assistance data for interactive access in the asset management client application in the client device.

20. The non-transitory computer readable medium as set forth in claim 19 wherein for the initiate the identification of the current geolocation data of the registered assets in the defined environment, the executable code when executed by the one or more processors further causes the one or more processors to:

identify device, which of the registered assets comprise one or more mobile assets; and determine a recorded amount of time any of the identified one or more mobile assets is currently away from a corresponding one of one or more stored home bases for each of the one or more mobile assets.

21. The non-transitory computer readable medium as set forth in claim 20 wherein for the provide the map of the registered assets positioned in the defined environment, the executable code when executed by the one or more processors further causes the one or more processors to:

provide a table of a current home-or-away status and the recorded amount of time currently away from the corresponding one of one or more stored home bases for each of the one or more mobile assets.

22. The non-transitory computer readable medium as set forth in claim 20 wherein the executable code when executed by the one or more processors further causes the one or more processors to:

limit the enabled operational aspects to a subset when the selected one of the subset of registered assets is one of the one or more mobile assets and is currently away from the corresponding one of the one or more stored home bases.

23. The non-transitory computer readable medium as set forth in claim 19 wherein for the enable real time interaction, the executable code when executed by the one or more processors further causes the one or more processors to:

provide in the asset management client application in the client device engagement of a scanner link for a code scanner to scan an identification code on the selected one of the subset of registered assets;

obtain asset detail data based on a received scan of the identification code from one or more remote server devices associated with the selected one of the subset of registered assets; and transmit the obtained asset detail data for interactive access in the asset management client application in the client device.

24. The non-transitory computer readable medium as set forth in claim 19 wherein the executable code when executed by the one or more processors further causes the one or more processors to:

determine a display capability of the client device; and adjust the asset assistance data provided for display in the asset management client application based on the determined display capability of the client device.

25. The non-transitory computer readable medium as set forth in claim 19 wherein for the enable real time interaction, the executable code when executed by the one or more processors further causes the one or more processors to:

enable an imaging link in the asset management client application to enable an imager in the client device; and obtain and store an image of the selected one of the subset of registered assets in response to notification of engagement of the imaging link.

26. The non-transitory computer readable medium as set forth in claim 19 wherein for the enable real time interaction, the executable code when executed by the one or more processors further causes the one or more processors to:

determine a system update status of the selected one of the subset of registered assets; and update the selected one of the subset of registered assets when the determining indicates the system update status of the one of the identified registered assets is out of date.

27. A non-transitory computer readable medium having stored thereon instructions comprising executable code when executed by one or more processors, causes the one or more processors to:

initiate an identification of current geolocation data of registered assets in a defined environment;

generate and provide a real-time map of the registered assets positioned in the defined environment based on the identified geolocation data;

identify for display in an asset management client application a subset of the registered assets based on a request received from the asset management client application in the client device; and enable real time interaction from the asset management client application in the client device with a plurality of executable operations for a selected one of the subset of registered assets, wherein for the enable real time interaction, the executable code when executed by the one or more processors further causes the one or more processors to determine a current service status of the selected one of the subset of registered assets;

identify any applicable warranty data based on the determined current service status; and initiate a request for any required service on the selected one of the subset of registered assets covered by the identified applicable warranty data based on the determined current service status.

* * * * *